United States Patent [19]
Baker

[11] Patent Number: 5,848,310
[45] Date of Patent: Dec. 8, 1998

[54] REMOVABLY MOUNTABLE PHOTOGRAPHIC SUBJECT ATTRACTOR DEVICE

[76] Inventor: Trudy S. Baker, 2052 La Jolla Dr., Stockton, Calif. 95204

[21] Appl. No.: 839,988

[22] Filed: Apr. 24, 1997

[51] Int. Cl.$^6$ .................................................. G03B 29/00
[52] U.S. Cl. ............................................................ 396/429
[58] Field of Search ...................................... 396/429, 544

[56] References Cited

U.S. PATENT DOCUMENTS

| 4,072,973 | 2/1978 | Mayo | 396/544 |
| 4,736,220 | 4/1988 | Heinzelmann | 396/544 |

*Primary Examiner*—Howard B. Blankenship
*Attorney, Agent, or Firm*—Mark C. Jacobs, Esq.

[57] ABSTRACT

An attention grabber or attention focusing device to serve as a point of eye contact for the party whose photo is to be taken, which device is removably mountable to any type of camera. Various embodiments of the device all feature a common base such that a plurality of these can be interchangeably used on the camera. The base is disposable in a receiver, which receiver can be removably or permanently affixed to a camera body. Each device includes at least one of two attention directing elements, selected from sound and light, which elements are disposed within a head section attached to an elongated cylindrical base.

12 Claims, 3 Drawing Sheets

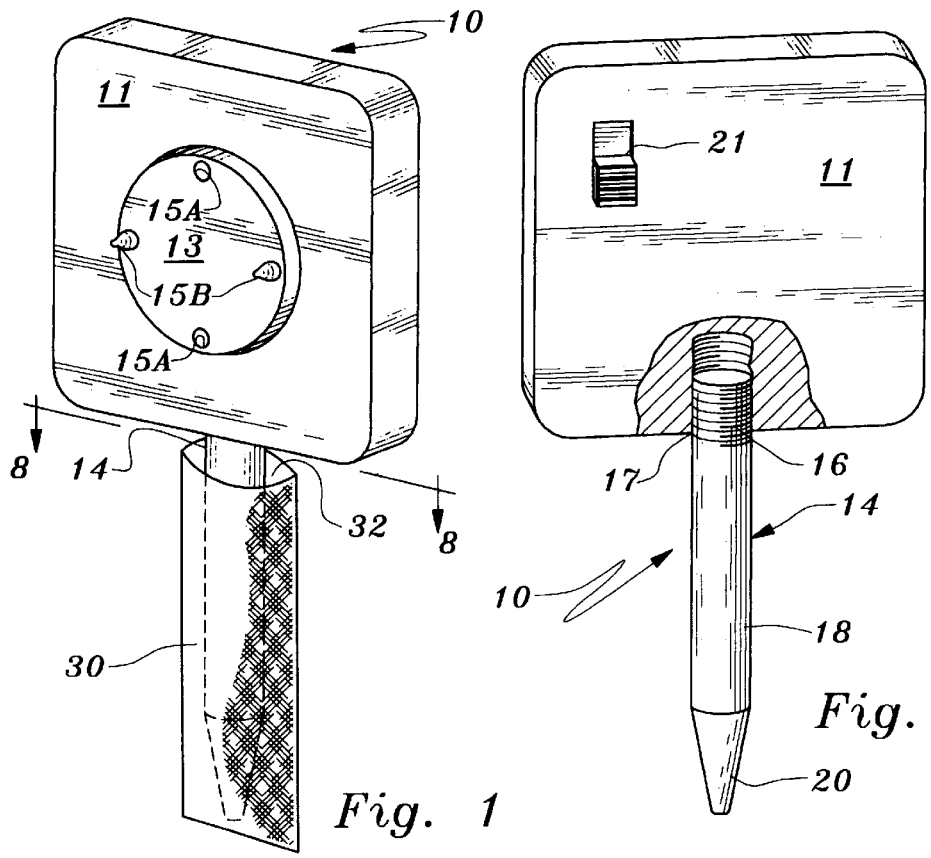
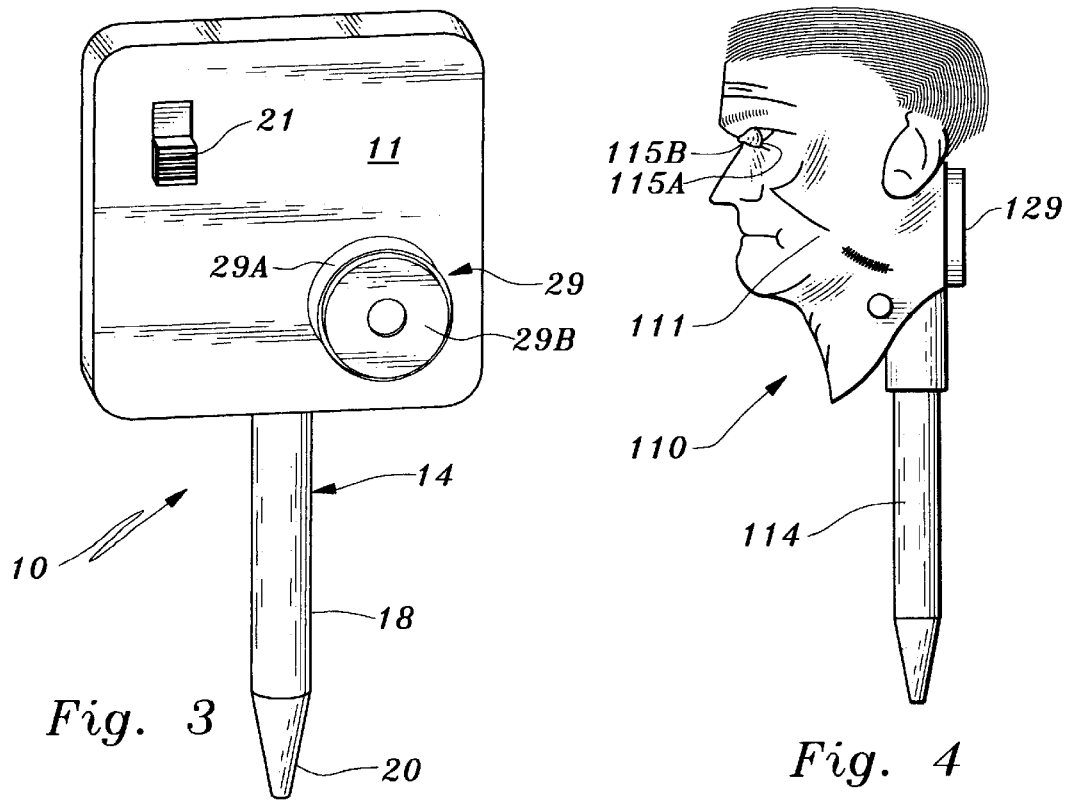

REMOVABLY MOUNTABLE PHOTOGRAPHIC SUBJECT ATTRACTOR DEVICE

FIELD OF THE INVENTION

This invention relates to a device which is removably attached to a camera body of any type to serve as a point of attention focus for the subject of the photograph to be taken.

BACKGROUND OF THE INVENTION

The taking of the picture of certain persons, especially young people, and animals such as dogs and cats, is often difficult, as they often fail to cooperate with the photographer, though not intentionally, by not looking at the camera when the shutter is to be snapped. I have now come up with a type of device that can be cosmetically configured as one desires, but which includes means for producing at least one of two attractor elements, sound and light, to focus the attention of the potential photographic subject upon the camera.

Accordingly, it is a first object of this invention to provide a device which features means for at least one of the two attractor elements of sound and light to serve as a focal point for the attention of a photographic subject.

It is another object of the invention to provide a device which includes both sound and light as a basis to attract the attention of a photographic subject.

It is a third object to provide an attention grabbing device which is releasably attachable to a camera body.

It is yet another object to provide a device which will grab the attention of youngsters such that their photo can be taken, yet not interfere with the camera's operation.

It is a further object to provide a device which is low in cost and quickly detachable from a camera body.

It is a still further object to provide an attention grabber that can be used interchangeably on 35 mm, APS, POLAROID, "istant photograph ": video cameras and any other new technology that may be developed in the future to which this invention may apply such as the new digital cameras with equal simplicity.

It is a yet further object to provide an attention grabber of any configuration which employs a common base disposable within a common receiver, which receiver is mountable to a camera body, such that various devices of this invention can be interchanged at will.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is a front perspective view of an attention grabber of a generic configuration according to this invention.

FIG. 2 is a rear perspective view thereof.

FIG. 3 is a rear perspective view similar to FIG. 2, of an attention grabber having only sound as the attention focusing element.

FIG. 4 is a side elevational view of a human head wherein the light and sound are controlled by the sound generator.

SUMMARY OF THE INVENTION

An attention grabber or attention focusing device which is removably mountable to any type of camera. A plethora of embodiments of the device all feature a common elongated, preferably cylindrical base attached thereto, such that a plurality of these can be interchangeably used on the camera. The base is disposable in a receiver, which receiver can be removably or permanently affixed to a camera body. Each device includes means for producing at least one of two attention directing elements, selected from sound and light, found within a head section attached to the base.

DESCRIPTION OF THE PREFERRED EMBODIMENT

The reader's attention is directed to FIG. 1. Here a generic attention grabber is seen from the front. Device 10 has a generally rectangular body 11, designated a head section, with a light containing central portion 13 disposed therein or thereon. As seen here center portion 13 stands outwardly from the surface of the balance of the body 11, but such is not critical to the invention. It could be flush or even recessed. Central portion 13 includes a quartet of openings 15A, two of which are depicted as having peanut bulbs 15B therein. These peanut bulbs include directly attached wiring for the circuitry. Such super low voltage lights may be glued or held frictionally within the openings 15A as is known to the lighting art. Other lighting means can be used as well. Thus a miniature socket wired to the circuitry for receipt of a screw in or bayonet base bulb such as found in flashlights could also be employed. No criticality is found in the type of light fixture and bulb used. Thus even light emitting diodes of various colors such as blue and red may be employed as light generating sources. A conventional slide switch 21 readily available in the marketplace is used to actuate the lights which are battery (not seen) powered.

Figure 10:
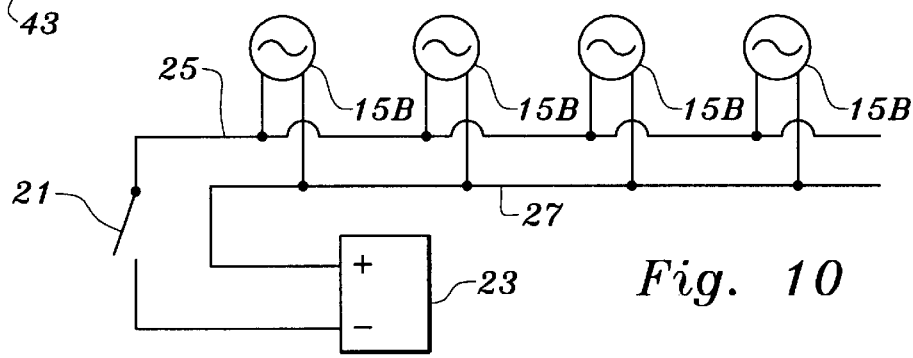
FIG. 10 is a circuit diagram illustrating the operation of a suitable lighting circuit for this invention.

A simple conventional parallel connection circuit for the operation of the lights is shown in FIG. 10. Thus the plurality of lights 15B are shown connected to the wires 25 and 27 while switch 21 is interposed along the line of wire 25. Both wires terminate at opposite ends of battery 27. Typically for bulbs of this nature, a button cell can provide adequate power. In the alternative larger amperage batteries such as AAA can be employed and still not occupy too much space. If desired, a conventional flasher means can be interposed in the circuit to make the lights blink. If desired a series circuit can also be employed in the alternative. No criticality is to be attributed to the bulb type, the circuit or the type of battery to power the circuit.

While the slide switch 21 is shown on the rear face of the head 11, the switch could be mounted for side access or even front access if desired. No criticality is to be attached to the location of or number of lights either, as will be seen from a viewing of other more complex configurations seen in the drawings infra.

Sound generator means 29 is shown mounted to or within head section 11. Mounting can be by the use of a low temperature hot glue gun glue or other suitable retaining means. Typical of the sound generator means utilizable in this invention are the Deluxe Electronic Music Boxes, having the configuration of a 35 mm diameter circular member of about ¼ inch elevation and bearing part number 3187, as sold by Fibre-Craft Materials Co. of Niles Ill. These little devices are battery operated music boxes imported from China and are readily available in craft stores nationwide. Actuation occurs by a slight inward push upon a metal disk disposed within an annular plastic case. Happy Birthday for example plays for about 22 seconds. Other tunes, are slightly longer or shorter in duration. Other types of miniature music boxes, or other sources of sound can also be employed in this invention.

The discussion now moves from the head section to the base section of this device. Base 14 of the FIG. 1 embodiment, seen in both FIGS. 1 and 2 includes a male threaded section 16 at its upper end for threaded engagement with the internal female threads of opening 17 in the bottom wall of head section 11 for the connection of the base to the head. While shown as being severable, it is within the skill of the art for the base to be integrally molded to the head section. The base 14 includes the aforementioned upper end, 16, a central leg section 18, and a preferably tapered foot section 20. See FIG. 1.

For the removable mounting of the device 10, the base 14's preferably tapered foot 20 and preferably only a portion of the leg 18 are disposable within a closed end tubular receiver 30 also as seen in FIG. 1. The recommendation that only a portion of the leg section be disposed within the receiver is to enhance ease of removability of the leg from the receiver without having to physically touch the head section which as seen in the drawing infra can be quite delicate and/or intricately shaped.

Figure 9:
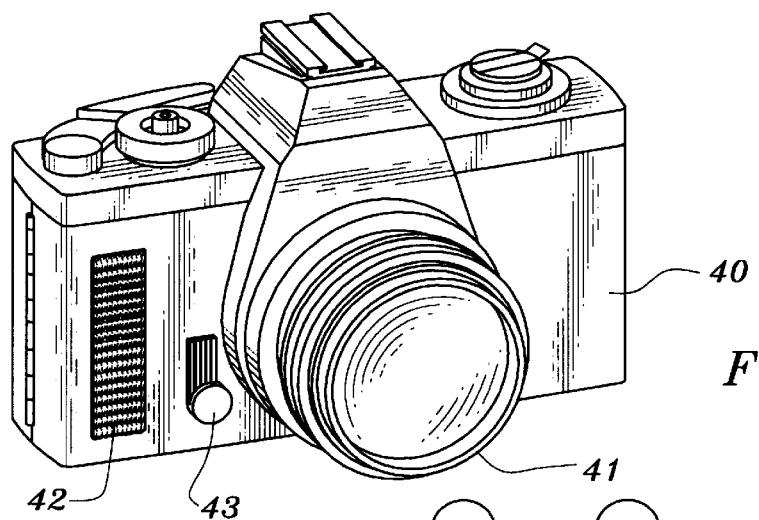
FIG. 9 is a front perspective view of a typical 35 mm interchangeable lens camera with a VELCRO "hook and loop fastening system" tab thereon for the receipt of the base of a device according to this invention.
Figure 11:
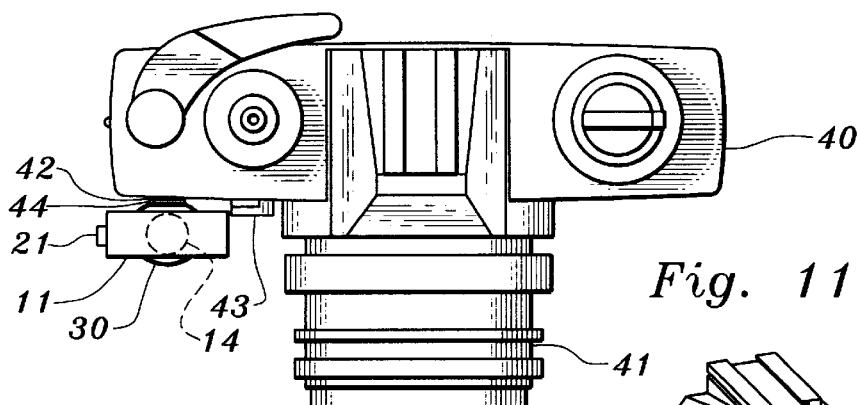
FIG. 11 is a top plan view of a device according to this invention mounted on a typical 35 mm interchangeable lens camera body.

In FIG. 9 there is seen a typical single lens reflex camera body 40 with a removable lens 41 attached thereto in any conventional manner. A VELCRO "hook and loop fastening system" or other brand of hook and pile fabric fastening means strip 42 is shown adhered to the front surface of the camera body 40 at a location such as not to interfere with any controls such as the self timer. The other strip, as will be discussed below with reference to FIG. 11, is adhered to the receiver. The pile strip, which can be either the one affixed to the camera body or to the receiver contains the "pile" in relatively stiff fibers resembling a carpet. The other strip includes the "hook" elements comprising a large plurality of hook-shaped fibers. These strips mate together firmly, but not inseparably upon being pressed together. Disengagement is carried out by a hand "peeling" force to separate one layer from the other. Reference is made to U.S. Pat. No. 4,047,250 for further details.

Figure 12:
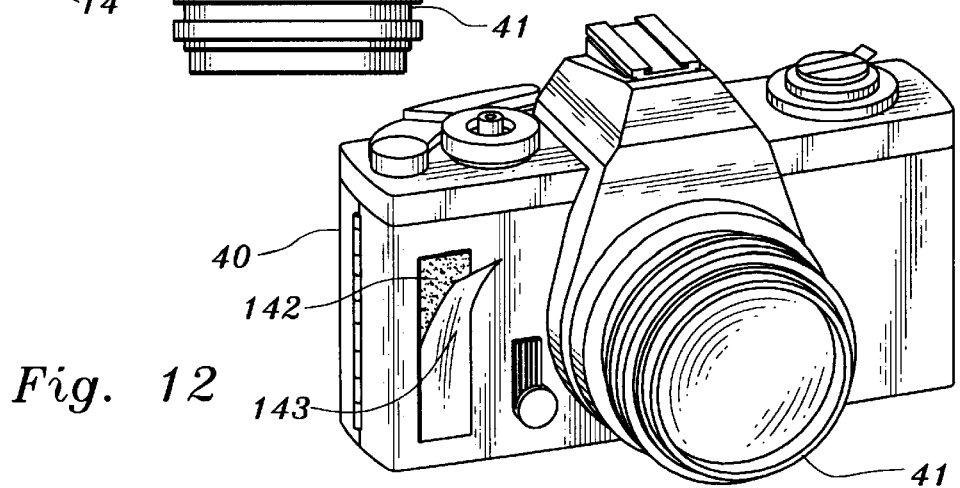
FIG. 12 is a view similar to FIG. 9 but utilizing double faced tape as a permanent mount.

FIG. 12 is a view similar to FIG. 9, and since like numbers refer to like parts, most elements seen in this view will not be described. Thus fastening strip 42 of FIG. 9 has been replaced by a double faced sticky substrate 142. Such substrates are sold with a peel off protection layer on each side of the two surfaces. One such cover layer 143 is seen here.

These sticky surfaces comprise a coating of adhesive on a substrate such as fabric, paper or card stock. The peel off protective layer (143) is removed just prior to application to a surface. Articles of this nature are readily available in the marketplace.

While the sticky tape is shown in position on the camera body 40, it could just as easily have been first applied to an attention grabber first and then to a camera body. The point being that only one such mount is used, with the first adhesion being on either the camera or the attention grabber as may be desired.

Figure 8:
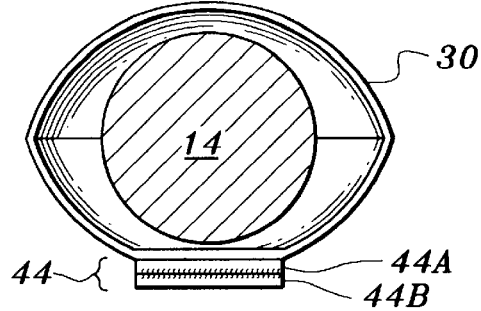
FIG. 8 is a top plan view showing a portion of any attention grabber according to the invention and a receiver for same as taken along line 8—8 of FIG. 1.

In FIG. 11 there can seen the second or opposite strip here arbitrarily designated the female strip 44,—with the male strip being the one designated 42 and seen in FIGS. 2 and 9. Strip 44 is also secured by adhesive along the length of the rear area of the base 14. Such self adhesive applied VELCRO strips 44, are readily available in the market place. See FIG. 8 wherein a typical base 14 is shown in top plan inserted within a receiver 30. The strip 44 is seen to include an adhesive layer 44A and the fabric layer 44B, as is well known in the art.

By using a removable attachment means for the receiver to camera body mounting, the devices of this inventor, and in particular the receiver can be demounted from the camera body for those instances when the presence of the invention of this application is unwanted.

FIG. 11 illustrates in top plan the mounting of a typical device according to the invention to the camera body 40. Thus head section 11 with the attached base 14 is seen disposed within its receiver 30. The receiver in turn carries a VELCRO "hook and loop fastening system" strip 44, which is removably engaged to an opposite sexed VELCRO "hook and loop fastening system" strip 42 attached (per FIG. 11 also ) to the camera body 40. Thus as explained supra, the device of this invention can be readily removed from the camera body when desired by lifting it from the receiver attached to the camera body. The reader's attention is drawn to the fact that in this drawing, switch 21 for the lights is shown mounted on the right side of the head section 11 as an alternative location to the rear surface disposition of FIG. 11.

Reference is now made to FIG. 3 which is a rear elevation of a device similar to that shown in FIG. 2. Here only the sound element 29 to focus the attention of a person nearby is present. Sound means 29 includes a housing 29A and a central actuator disk 29B which is pushed inwardly to start the sound. Further details on these sound generators which usually emanate from China are found elsewhere herein. While some of the sound generators in the marketplace play musical songs, others simulate the human voice and are used in dolls, and still others make noises only to scare you rather than soothe you.

In FIG. 4, there is seen a side elevational view of an attention grabber 110 based upon the head of what is commonly referred to as a ghoul, a figure found in Halloween decorations. In this attention grabber, the sound generator 129 is recessed into literally the head section 111.

Optional bulbs 115B may be disposed as by adhering them into suitable eye openings 115A. It is within the skill of art to provide circuitry such that the eye lights are actuated simultaneously with the sound by depressing a disk that if visible would be designated 29B. It is also within the skill of the art to include a flasher means within the light circuitry such that the lights blink rather than remain on for a finite period and then go off. Such effects are well known in the Christmas decoration art.

In the device of FIG. 4, the base section is rear mounted rather than bottom mounted, to the head section as by hot glue, staples or any other suitable means. Head units such as 111 were found to be available in TOYS R US "toy stores" for modification into a device according to this invention.

Figure 5:
FIG. 5 is a front elevational view of the specific configuration of a second typical attention grabber according to this invention; namely, a snow flake and snowman.

Reference is now made to FIG. 5 which depicts the specific configuration of a snowman and lighted snow crystal. Nine lights are seen disposed within the snowflake. The device of this FIGURE represents an assemblage made from (I) a lighted snowflake and (II) a separate purely decorative bread dough, plastic or ceramic snowman, both of (I) and (II) having been cemented to a suitable base. The controls of this unit are similar to those shown in FIG. 2, i.e., separate controls for the lights and separate for the sound.

Figure 6:
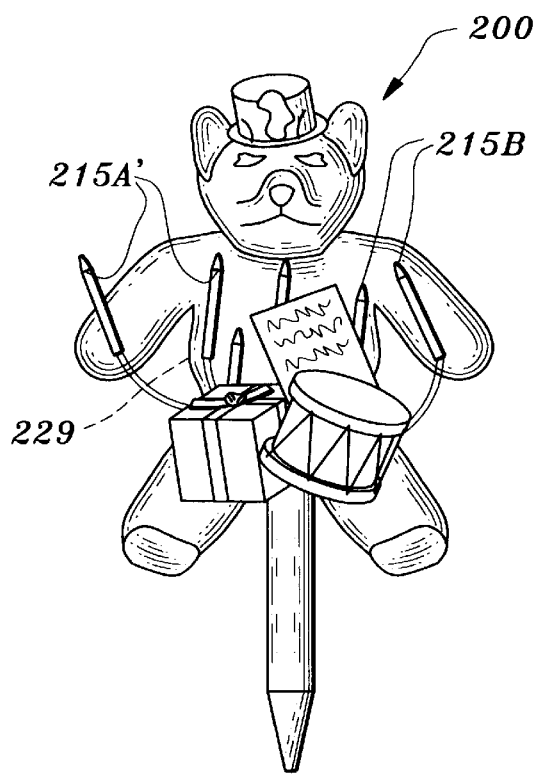
FIG. 6 is a front perspective view of the specific configuration of a third typical attention focusing device according to this invention; namely a teddy bear.
Figure 7:
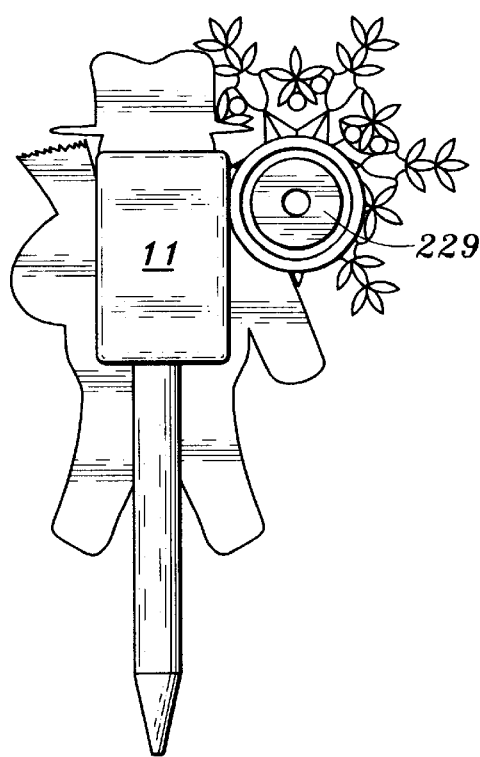
FIG. 7 is a rear perspective view of the specific configuration of the third typical attention director according to the invention.

In FIG. 6, a small teddy bear attractor 200, about 5 inches tall is seen in a front perspective view. Like numbers reflect like parts except that the numbers here are in the 200 series. This unit includes a plurality of light emitting diodes, 215B disposed in suitable diode sockets 215A', with the wiring from the plurality of LEDs being connected to the sound generator 229 for simultaneous actuation. Optionally a flasher mechanism can be interposed in the lighting circuit to have the diodes blink. Such lighted teddy bears as well as other lighted animals are available in craft and other stores nationwide.

In order to transform this bear which serves as a head section 211 into a device 200 according to the invention, an elongated cylinder, tapered at its terminus or "distal" end, was glued or other wise attached to the periphery of the sound generator 229. See FIG. 6.

MANUFACTURE

The devices of this invention can be readily made by assembling over the counter components. Thus various configurations such as but not limited to those shown in the drawings of this application—the teddy bear, the ghoul, the snowman both with and without the lighted snowflake et cetera, were all made into attention grabbers according to this invention from store-bought decorative items, which already included lights or sounds. Additional themes such as 4th of July, sports, Easter, birthdays might also be made. These items which are available from such diverse locations as craft stores, toy stores, super drug stores, five and dime stores and other retailers, can all serve as head sections to be easily converted into devices according to this invention by the application of hot glue for attachment of a suitable base section as described above at a location on the pre-existing structure that does not interfere with the operation of whatever attractor element(s) are present. This attachment can be carried out by the application of hot glue from a glue gun or by any other suitable means such as stapling, binding, nailing et cetera, the operation depending on the nature of the material of the structure being adapted to serve as a head section. Of course devices such as those of FIGS. 1 and 2 can be created from scratch using market available materials such as sheet metal and sheet plastic. It is within the skill of the art to add the lights element and to attach an electronic music box or windup sound source to such a housing. Again, the base section would be attached by any appropriate means conventionally known as is deemed suitable to the materials.

Receivers can be easily formed as by molding of plastic, or metal bending techniques. The mode of application of self-adhesive strips of Velcro® is self evident.

While the base sections of each of the devices according to this invention are shown to be tapered at the distal end thereof, it is within the scope of the invention to have the shaft of the base be uniformly cylindrical without the taper, or of a square cross-section.

While the receivers of this invention have been shown to be detachable from the camera body, using hook and pile strips, it is readily recognized that the receiver can be permanently affixed to the camera body by a suitable adhesive, if desired.

A further extension of the technology is to directly mount the base section to the camera body and to dispense with the receiver. The benefit of same is the reduction in weight, but the detrimental aspect is that if permanent attachment transpires, then interchangeability is lost, and even if the base is attached removably s by VELCRO "hook and loop fastening system" strips, the spontaneity of the moment is lost due to the effort required for the peeling of one unit away from a VELCRO "hook and loop fastening system" layer that may be attached to a camera body. While a VELCRO "hook and loop fastening system" or other hook and loop fastening means provides a removable mount for the receiver, one can also use a permanent mount. Thus a double faced cloth tape mount attached to both the receiver and the desired location on the camera body may be employed. Suitable double stick tape strips are sold by Bulldog Home Hardware of Memphis, Tenn. among others. See the discussion pertinent to FIG. 12 supra.

In all of the embodiments depicted herein, the base was disposed below the head section. It is also within the scope of the invention to have the head section disposed below the base section as may be desired.

Since certain changes may be made in the above device without departing from the scope of the invention herein involved, it is intended that all matter contained in the above description, shall be interpreted as illustrative and not in a limiting sense.

I claim:

1. An attention grabbing device for attachment to a camera body to serve as a point of contact for the party whose photo is to be taken, which device comprises: a first portion and a second portion, said first portion comprising a head section and a base section;

said head section having means for producing at least one of two attractor elements selected from light and sound to be directed to the attention of the party whose photo is to be taken, said base section being a shaft connected to said head section and depending downwardly from said head section, and said shaft being removably receivable in a receiver, said second portion, comprising a receiver which is an elongated tube having a top end and a bottom end, the bottom end being closed off, said receiver being removably mountable to a camera body.

2. The attention grabber of claim 1 wherein two attractor elements are present in the head section, said attractor elements being light means and sound means.

3. The attention grabber of claim 1 wherein the head section is configured to include a face of one of a person and an animal.

4. The attention grabber of claim 2 wherein each element is independently activateable.

5. The attention grabber of claim 2 wherein both elements and are interconnected for simultaneous activation.

6. The attention grabber of claim 1 wherein said receiver is mountable by means of a VELCRO "hook and loop fastening system" strip disposed along the length of the receiver.

7. The device of claim 2 wherein the light means produces a blinking light when activated.

8. The device of claim 1 wherein the sound element is produced by an electronic music box and the receiver is vertically mountable.

9. The device of claim 1 wherein the light element is produced at least one light emitting diode.

10. The device of claim 2 wherein each element is independently activateable and the receiver is vertically mounted.

11. The attention grabber of claim 1 wherein the receiver includes a double face sticky tape disposed thereon.

12. The device of claim 2 wherein the distal end of the shaft is tapered and the receiver includes a double faced sticky tape thereon.

* * * * *